United States Patent
Raghunandan

(10) Patent No.: US 6,721,785 B1
(45) Date of Patent: Apr. 13, 2004

(54) SYSTEM FOR DIRECTING E-MAIL TO SELECTED RECIPIENTS BY APPLYING TRANSMISSION CONTROL DIRECTIVES ON ALIASES IDENTIFYING LISTS OF RECIPIENTS TO EXCLUDE OR INCLUDE RECIPIENTS

(75) Inventor: Hulikunta Prahlad Raghunandan, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 09/589,140

(22) Filed: Jun. 7, 2000

(51) Int. Cl.[7] ............................................. G06F 15/16
(52) U.S. Cl. ..................... 709/206; 709/207; 709/204
(58) Field of Search ................................. 709/204, 205, 709/206, 207, 245; 707/102

(56) References Cited

U.S. PATENT DOCUMENTS

| | | | | |
|---|---|---|---|---|
| 5,694,616 A | * | 12/1997 | Johnson et al. ............. | 709/207 |
| 5,805,830 A | * | 9/1998 | Reese et al. ................ | 709/205 |
| 5,864,684 A | | 1/1999 | Nielsen .................. | 395/200.36 |
| 6,052,709 A | * | 4/2000 | Paul ........................... | 709/204 |
| 6,163,809 A | * | 12/2000 | Buckley ...................... | 709/206 |
| 6,275,850 B1 | * | 8/2001 | Beyda et al. ................ | 709/206 |
| 6,308,179 B1 | * | 10/2001 | Petersen et al. ............ | 707/102 |
| 6,405,243 B1 | * | 6/2002 | Nielsen ....................... | 709/206 |
| 6,424,828 B1 | * | 7/2002 | Collins et al. ............... | 709/206 |
| 6,480,885 B1 | * | 11/2002 | Olivier ........................ | 709/207 |
| 6,553,425 B1 | * | 4/2003 | Shah et al. .................. | 709/206 |
| 6,574,671 B1 | * | 6/2003 | Haynes ....................... | 709/245 |
| 6,584,564 B2 | * | 6/2003 | Olkin et al. ................. | 713/152 |

\* cited by examiner

*Primary Examiner*—Le Hien Luu
*Assistant Examiner*—Quang Nguyen
(74) *Attorney, Agent, or Firm*—T. Rao Coca; Anthony V.S. England; Manny W. Schecter

(57) ABSTRACT

This invention relates to a method, apparatus and program product for transmitting email to selected recipients defined by one or more aliases in identified lists of recipients, by providing transmission control directives given by the user, parsing the said directives, expanding aliases wherever necessary and applying each directive to the identified lists of recipients.

20 Claims, 3 Drawing Sheets

SYSTEM FOR DIRECTING E-MAIL TO SELECTED RECIPIENTS BY APPLYING TRANSMISSION CONTROL DIRECTIVES ON ALIASES IDENTIFYING LISTS OF RECIPIENTS TO EXCLUDE OR INCLUDE RECIPIENTS

FIELD OF THE INVENTION

This invention relates to a system for directing e-mail to selected sets of recipients.

BACKGROUND OF THE INVENTION

Electronic mail provides a quick and convenient way for computer users to communicate. This communication is initiated by a message sender who composes the message using a text editing program, provides the e-mail address of the intended recipient, and often provides an indication of the content (subject matter) of the message by providing text in a "subject" field. Using well-understood technology this composed message is then sent to the recipient's computer address. The recipient's computer receives the message and stores it in the recipient's inbox. The recipient eventually reads, deletes, responds to, or otherwise processes the message stored within the inbox by using any of a number of email programs well known in the art.

The header portion of an email message contains fields composed of character strings comprising a field-name followed by a colon, followed by a field-body terminated by a carriage return/line feed. An example header field is:

"To: John Doe<CR><LF>".

In this example, the <CR> represents the ASCII carriage return character and the <LF> represents the ASCII line feed character. The header filed-names are not case sensitive, thus, "to:" is equivalent to "TO:" or "tO:".

The contents of these headers are specified by the entity that composes the message.

The "To:" field-body contains the addresses of the primary recipients of the message where the address of each recipient is separated by a comma. Recipients include both humans and programs. The "Subject:" field-body often provides a summary, or indicates the nature, of the message and sometimes contains a specialized command string that is to be recognized by the recipient. Although, these fields are all initialized by the sender, the recipient fields are generally limited to actual Internet addresses. On the other hand, the subject field has no specific meaning and may, in fact, be blank, contain a specialized command string or contain a random arrangement of characters. Additional "cc:" and "bcc:" field bodies are optional means for sending declared and undeclared ('blind') copies of the message to one recipient or groups of recipients.

A sender can address a single message to many recipients by separating the addresses of the recipients with a comma. Each of these recipients may respond to the original message by sending a reply message to the same list of recipients (plus the original sender). Some of these recipients may then respond to the first reply message. These reply messages are termed follow-up messages to the original message. This process facilitates a vigorous discussion between the original sender and the recipients, as well as between the recipients.

Very often, a recipient or group of recipients who are frequently contacted, are identified by an alias (a name string) in order to facilitate identification and/or reduce the burden of repeatedly entering the individual email addresses. An alias may correspond to a group of email addresses and may further make reference to other aliases. In this manner a complex hierarchy of aliases can be established.

With e-biz coming of age and the internet usage increasing in exponential proportion there is a severe need to supplement e-mail tools with powerful facilities so as to enable optimal utilization of internet bandwidth with ease of use. E-mail usage is also likely to increase exponentially. While all efforts are being made to develop and provide appropriate internet infrastructure, concerted efforts are needed to optimize e-mail usage and there is a dire need to improve the current facilities. For example, existing email systems do not provide any means to selectively alter lists of recipients as needed. This results in the user having to either manually enter a large number of recipient aliases and/or email addresses or alternatively the email is transmitted to everyone in the list resulting in wasted bandwidth and confusion.

The existing email systems have following limitations: Absence of Ability to Deny Mail to One or More Sub-aliases or E-mail Addresses which are Already Listed in One or More Identified Mailing Lists Consider a situation for example:

To: Alias1
Cc: Alias2
Bcc: Alias3
Group: Alias4

Where "Group" refers to groups of recipients, such as newsgroups.

Let Alias1 consist of Alias11, Alias12, . . . Alias1n
Let Alias2 consist of Alias21, Alias22, . . . Alias2n
Let Alias3 consist of Alias31, Alias32, . . . Alias3n
Let Alias4 consist of Alias41, Alias42, . . . Alias4n If one were to send a mail that were to be denied to say: Alias12, Alias22, Alias31 and Alias42 and u1@d1.com which is listed under Alias11 and u2@d2.com which is listed under Alias12 there is no way one can do that with the existing e-mail features without expanding all the aliases and removing the e-mail addresses that need to be denied.

Absence of Nested Inclusion and Exclusion of Aliases

Consider the a situation where an alias is structured as follows:

Alias1–Alias11, Alias 12, . . . Alias1n
Alias11–Alias111, Alias112, . . . Alias11n
Alias(1 . . . 1ntimes)–Alias(1 . . . 1ntimes)1, Alias(1 . . . 1ntimes)2 . . . Alias(1 . . . 1ntimes)n
:
:

If one were to send mail such that it includes Alias1 but excludes Alias11 and includes Alias111 but excludes Aliass1111 but includes Alias11111 and excludes Alias111111 then it is not possible to ensure this in a simple fashion using existing mail features.

U.S. Pat. No. 5,864,684 describes an invention for enabling a user to exclude himself from subscription to a mailing list either temporarily or permanently. In other words, this patent implements subscription and unsubscription to automatic mailing lists. This patent does not address the problem of selective transmission of an email message to a number of recipients.

THE OBJECTS AND SUMMARY OF THE INVENTION

The object of this invention is therefore to introduce a feature in email software to provide the ability to deny mail to one or more sub-aliases or e-mail addresses already listed in one or more identified mailing lists.

The second object of the invention is to provide a facility for nested inclusion and exclusion of aliases.

To achieve said objectives, this invention provides in a computing system, a method for transmitting e-mail (electronic mail) to a plurality of recipients identified by one or more aliases in identified list or lists of recipients, characterized in that said method includes selectively enabling or denying the transmission of email to identified recipients or groups of recipients in any of said aliases, comprising the steps of:

providing transmission control directives by the user, parsing said transmission control directives to identify transmission requirements, expanding aliases mentioned in any of said transmission control directives wherever necessary using stored lists of alias definition, applying each said parsed transmission control directive on said aliases in said identified list or lists of recipients so as to exclude or include a recipient or a group of recipients in said identified list or lists.

One or more of said aliases are nested aliases that contain one or more aliases within them.

The recipients are included or excluded from said identified list or lists based on the order in which the inclusion or exclusion is defined.

The said identified list or lists include lists for sending copies and/or sending blind copies and lists for groups.

The said transmission control directives are by means of exclusion strings, "Deny-To", "Deny-Cc", "Deny-Bcc", "Deny-Group" and "Deny-Attachment", wherein define recipients that are to be excluded from the identified, "To:", "Cc:", "Bcc:" and "Group:" lists respectively while "Deny attachment" identifies recipients that are excluded from receiving attachments.

The said transmission control directives are by means of exclusion string '-E' and inclusion string '-I' definitions in the 'To:', 'Cc:', 'Bcc:' and 'Group:' identified lists of recipients, where "Group:" recipients include newsgroups.

The exclusion string '-E' and inclusion string '-I' is applied to exclusion string 'Deny-To:', 'Deny-Cc:', 'Deny-Bcc:', 'Deny-Group:' and 'Deny-Attachment:' to identify recipient for exclusion or inclusion.

The said transmission control directives are implemented in accordance with rules based on requirements of implementation.

The said exclusion directive defined twice for the same recipient or group of recipient effectively includes said recipient or group of recipient.

This invention further provides an email transmission apparatus configured to transmit email messages to selected recipients and groups of recipients from identified list or lists of recipients; said apparatus having a central processing unit (CPU), associated memory and storage devices and input output devices, comprising:

an inputting mechanism for obtaining aliases and transmission control directives from the user, a parsing mechanism for identifying transmission control directives provided by the user, an expansion mechanism for expanding aliases mentioned in any of said transmission control directives where necessary using stored alias definition lists, an exclusion mechanism for removing specific aliases or email addresses from said defined list or lists of recipients, based on the transmission control directives, an inclusion mechanism for adding specific aliases or email addresses to the aliases in said defined list or lists of recipients.

The said inputting mechanism comprises:

an exclusion definition string, one or more aliases or email address strings to be excluded, and optionally, an inclusion definition string, one or more aliases or email address strings to be included.

The said parsing mechanism is any standard parsing means.

The said expansion mechanism comprises:

a database or file storage mechanism for storing the email addresses for each alias, an accessing mechanism for retrieving the email addresses from said storage mechanism.

The said exclusion mechanism includes a means for removing one or more aliases or email addresses from one or more said defined aliases in the list or lists of recipients, in accordance with rules based on requirements of implementation.

The said inclusion mechanism includes a means for adding one or more aliases or email addresses to one or more said defined aliases in the list or lists of recipients, in accordance with rules based on requirements of implementation.

Furthermore, the present invention provides a computer program product comprising a computer usable storage medium having computer readable code embodied therein for causing a computer to transmit email to a plurality of recipients, characterized in that it includes:

computer readable code devices configured to enable provision of aliases and transmission control directives by the user, computer readable code devices for parsing said transmission control directives to identify transmission requirements, computer readable code devices for expanding one or more aliases mentioned in any of said transmission control directives, where necessary using stored alias definition lists, computer readable code devices for application of each said parsed transmission control directive on said identified list or lists of recipients so as to exclude or include a recipient or a group of recipients in said identified list or lists, in accordance with rules based on requirements of implementation.

The said computer readable code devices for provision of transmission control directives by the user comprising:

computer readable exclusion definition string, one or more alias or email address strings to be excluded, and optionally, computer readable inclusion definition string, one or more alias or email address strings to be included.

The said computer readable code device for expansion of one or more aliases comprising:

a first computer readable code device for storing the email addresses for each alias, a second computer readable coded device for retrieving the email addresses from said storage.

BRIEF DESCRIPTION OF THE DRAWINGS

The invention will now be described in general with reference to the accompanying drawings and examples.

DETAILED DESCRIPTION OF THE INVENTION

Figure 1:
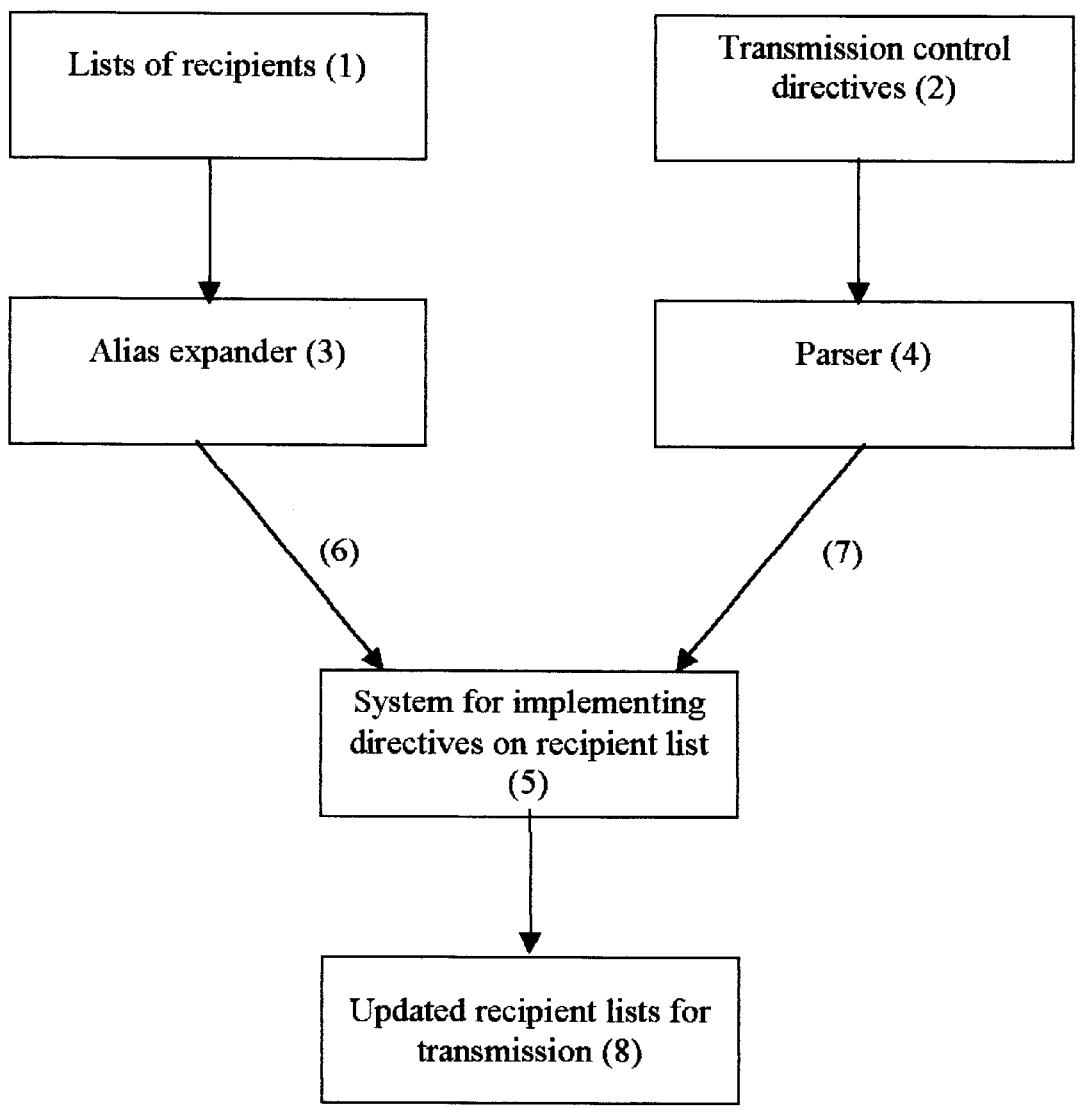
FIG. 1 shows the entity diagram of the system according to this invention.

As shown in FIG. 1, in addition to the normal lists of recipients (1), the user also specifies one or more transmission control directives (2), which define exclusion and/or inclusion of one or more recipients or group of recipients. Each recipient or group of recipients may in turn be identified by an alias. The system parses (4) the transmission control directives and expands (3) any aliases that may have been specified. It then implements (5) each of the parsed transmission control directives (7) on the expanded lists of recipients (6) proceeding in the sequence in which the directives are specified. An exclusion directive results in the deletion of the email address/alias from the recipient list, whereas an inclusion directive results in the addition of the email address or the alias to the recipient list. Since the directives are implemented in the order in which they are specified conflicting directives result in the last directive being effective (i.e. an exclusion followed by an inclusion will result in the recipient being retained in the list). Once each of the transmission control directives has been implemented on the lists of recipients, we obtain the final lists that are used for transmission of the email message.

Figure 2:
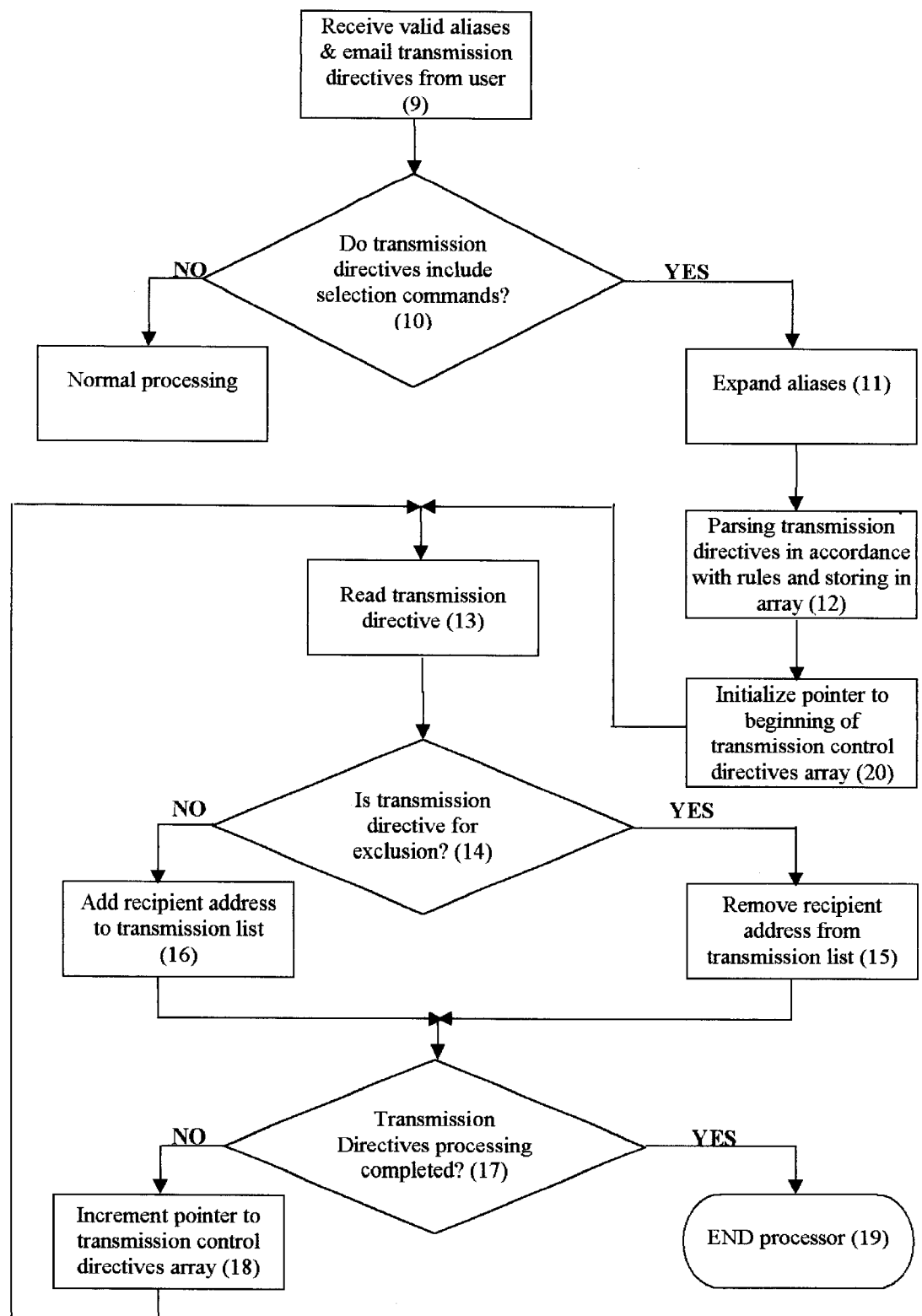
FIG. 2 shows the sequence of operation performed by the system

FIG. 2 shows the sequence of operation performed by the system by way of illustration. The system receives lists of email addresses along with email transmission directives (9) from the user. The system then checks whether the transmission directives include any selection commands (10). If no selection commands are specified, further processing is suspended and the email lists remain unchanged. If however, the user has specified selection command, then the system scans each of the lists of the email address expanding any aliases that it finds (11). The email transmission directives are then parsed in accordance with rules and stored in array (12). The pointer for reading the array is thereafter initialized to the beginning of the array (20). As each parsed transmission directive is read (13), it is checked to determine whether it is an inclusion directive or an exclusion directive (14). In case it is an exclusion directive, then the corresponding email address of the recipient or group of recipients is deleted from the lists of addresses (15). Similarly, if the directive is an inclusion directive then the corresponding email address(es) is added to the list of email addresses (16). The system then checks to confirm whether all the directives have been implemented (17). If some directives remain (18) then processing is continued, otherwise the final lists of email addresses are outputted by the system (19).

Figure 3:
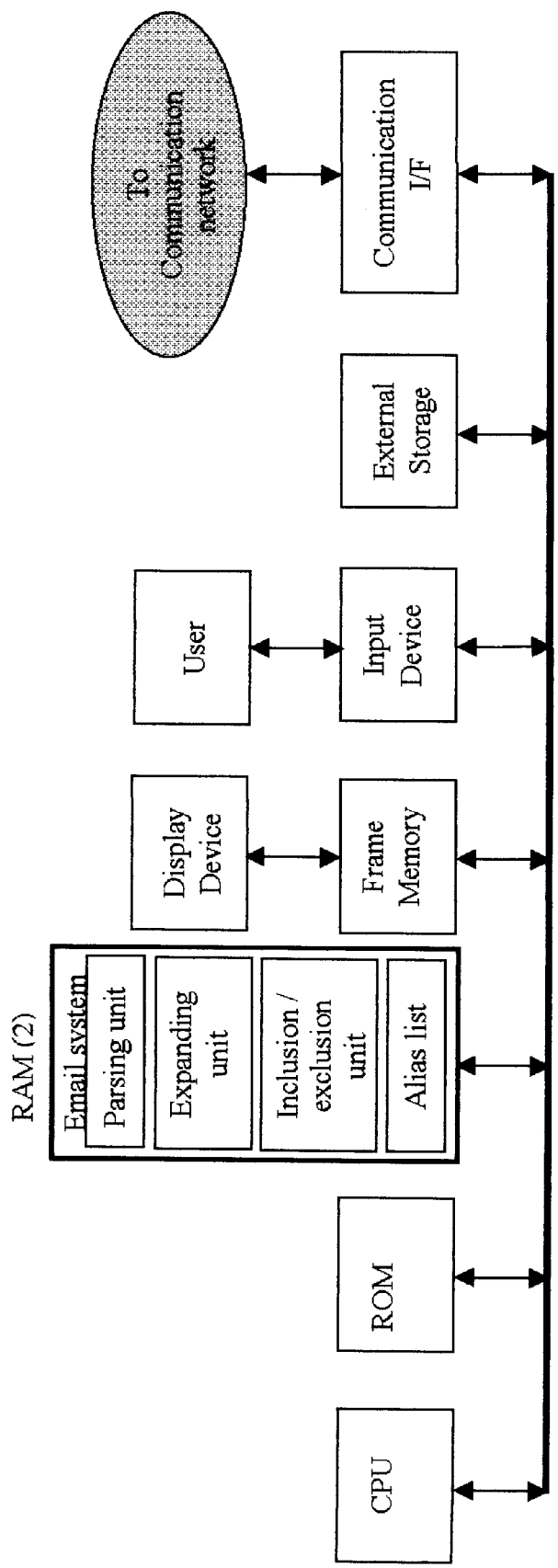
FIG. 3 shows an email transmission apparatus.

FIG. 3 shows the email system including parsing unit, expansion unit and exclusion/inclusion unit in Ram (2) of the apparatus. The Ram (2) also contains alias definition lists. The user (4) provides the transmission control directive through input device (5). The CPU (6) executes the email system program using transmission control directives provided by the user (4) and alias definition list to define the recipients of the email message given by the user.

EXAMPLE 1

Problem

Ability to Deny Mail to One Sub-alias or E-mail Address Which is Already Listed in the To:, Cc:, Bcc: or Group: Fields.

For example consider a situation involving the following four identified lists of recipients:

To: Alias1
Cc: Alias2
Bcc: Alias3
Group: Alias4
   Let Alias1 consist of Alias11, Alias12, . . . Alias1n
   Let Alias2 consist of Alias21, Alias22, . . . Alias2n
   Let Alias3 consist of Alias31, Alias32, . . . Alias3n
   Let Alias4 consist of Alias41, Alias42, . . . Alias4n If one were to send a mail that were to be denied to say: Alias12, Alias22, Alias31 and Alias42 and u1@d1.com which is listed under Alias11 and u2@d2.com which is listed under Alias12 there is no way one can do that with the existing e-mail features without expanding all the aliases and removing the e-mail addresses that need to be denied.

Solution to above problem, according to this invention is by introducing exclusion strings "Deny-To", "Deny-Cc", "Deny-Bcc" and "Deny-Group", as follows:

To: Alias1
Cc: Alias2
Bcc: Alias3
Group: Alias4
Deny_To: Alias12
Deny_Cc: Alias22
Deny_Bcc: Alias31
Deny_Group: Alias42
Deny_Attachment: Alias5

Here the aliases (and e-mail addresses contained therein) mentioned for

Deny_To:, Deny_Cc:, Deny_Bcc and Deny_Group: fields would be denied e-mail while the aliases listed in the field Deny_Attachment: field would only be denied attachments.

EXAMPLE 2

Problem

A Nested Inclusion and Exclusion of Aliases

Consider the a situation where an alias is structured as follows:

Alias1–Alias11, Alias12, . . . Alias(1 . . . 1n times)
Alias11–Alias111, Alias112, . . . Alias11n
:
:
Alias(1 . . . 1ntimes)–Alias(1 . . . 1ntimes)1, Alias(1 . . . 1ntimes)2 . . . Alias(1 . . . 1ntimes)n If one was to send mail such that it includes Alias1 but excludes Alias11 and includes Alias111 but excludes Aliass1111 but includes Alias11111 and excludes Alias111111 then it is not possible to ensure this in a simple fashion using existing mail features.

Solution, According to this Invention

The present invention provides a solution for this by using exclusion string '-E' and inclusion string '-I' that can be used with each identified list, namely, To:, Cc:, Bcc: and Group:

To: Alias1 -E Alias11 -I Alias111 -E Alias1111 -I Alias11111 -E Alias111111 can easily realize the expected task.

Where '-E' specifies exclusion and '-I' specifies inclusion.

Care should be taken that the order in which this is mentioned is proper. The implementation needs to ensure that parsing is done from left to right and the precedence is given to the later specification.

A similar facility can be included in the following fields:

Cc:

Bcc:

Group:

Deny_To:

Deny_Cc:

Deny_Bcc:

Deny_Group:

Deny_Attachment: Alias5

As can be seen, the new facility can allow for mail to be sent to a very complex subset of aliases.

If there is a conflict with the specifications in the To:, Cc:, Bcc: Group: and the Deny_To:, Deny_Cc:, Deny_Bcc:, Deny_Group: fields then the later specification prevails.

Consider the situation where an alias is structured as follows:

Alias1–Alias11, Alias12, . . . Alias(1 . . . 1n times)

Alias11–Alias111, Alias 112, . . . Alias11n

:

:

Alias(1 . . . 1ntimes)–Alias(1 . . . 1ntimes)1, Alias(1 . . . 1ntimes)2 . . . Alias(1 . . . 1ntimes)n If one was to send mail such that it includes Alias1 but excludes Alias11 and includes Alias111 but excludes Aliass1111 but includes Alias11111 and excludes Alias111111 then it is not possible to ensure this in a simple fashion using existing mail features.

The present invention provides for this by using options that can be used with each field like To:, Cc:, Bcc: and Group:

Usage—1:

To: Alias1 -E Alias11 -I Alias111 -E Alias1111 -I Alias11111 -E Alias111111 can easily realize the expected task.

Where '-E' specifies exclusion and '-I' specifies inclusion.

There are other right and wrong ways to specify the recipient list. The following examples further illustrate the same.

Usage 2:

To: Alias1 -E Alias11, Alias111 -E Alias1111, Alias11111, -E Alias111111

Note that here the '-I' has been removed and the aliases that need to be included are simply separated by commas.

Here the Alias111, which is part of Alias11, would be included even though its parent is excluded. This would give the same result as shown in Usage 1.

Usage 3:

To: Alias1, Alias111, Alias11111,

Deny_To: Alias11, Alias1111, Alias111111

Here in the To: list Alias1 includes Alias111 and Alias11111 at different levels therefore mention the other two aliases is redundant. Since the protocol followed is that the later enumeration is given preference, the Deny_To: list will be excluded from the list of recipients. Namely, Alias11 would be removed completely (including Alias111, Alias1111, Alias11111 etc.) from the recipient list. This does not have the desired effect and this enumeration has a different result from that mentioned in Usage 1 and 2.

Usage 4:

To: Alias1 -I Alias111 -I Alias11111

Deny_To: Alias11, Alias1111, Alias111111

Here in the To: list the '-I' option cannot be used without being preceded by a '-E' option. This usage is therefore illegal.

Usage 5:

To: Alias1

Deny_To: Alias11 -E Alias111, Alias1111 -E Alias11111, Alias111111

Using the '-E' option in the Deny_To list means exclusion from the Deny_To list which translates to non-exclusion from the To_list . So in the above example Alias111 and Alias11111 are included in the recipient list while all remaining recipients mentioned in Alias11, Alias1111 and Alias111111 are removed from the recipient list (denied mail).

One Embodiment of Rules for Implementation

1. Precedence is given from left to right and top to bottom while parsing aliases and resolving the recipient list.
2. Precedence is given to exclusion when compared to inclusion in the same class of recipient lists. Therefore the Deny_To list will have a higher precedence than the To_list. But Deny_To list will not override Cc_to list.
3. Any to_list can contain aliases that are comma separated, alias names followed by -E and -I flags with aliases to be excluded or included.
4. A -I flag cannot be used without being preceded by a -E flag. But he converse is not true. That is a -E flag can be used without being followed by a -I flag.
5. A -E flag in deny_to list means inclusion in the recipient list.
6. While there appears to be many ways of achieving the same result, the same is supported in order to broaden the scope of the invention and in order to prevent a competitor from bypassing the invention in one way or the other.
7. At the same time by using aliases without understanding the precedence may lead to wrong results.

Implementation Details

The email system source code can be suitably modified to:

a. include new fields for "Deny-To", "Deny-Cc", "Deny-Bcc" and "Deny-Group"

b. provide for '-E' and '-I' options within each identified list of recipients. This can go on ad infinitum and shall only be limited by the hardware resources like memory and stack space etc. Available parsing tools can be used to select the final list of address after expanding the aliases.

The invention is not limited to the above illustrations of the invention.

I claim:

1. In a computing system, a method for transmitting e-mail (electronic mail) from a sender to a plurality of recipients identified by one or more aliases, wherein the one or more recipients are listed in at least one list identified by the sender, characterized in that said method includes selectively enabling or denying the transmission of email to identified recipients or groups of recipients in any of said aliases, comprising the steps of:

receiving transmission control directives from the sender for applying to the at least one list;

parsing said transmission control directives to identify transmission requirements;

expanding aliases mentioned in any of said transmission control directives wherever necessary using stored lists of alias definition; and excluding recipients from among the recipients in said identified at least one list and including recipients in addition to the recipients in said identified at least one list responsive to applying respective ones of the parsed transmission control directives on said aliases in said identified at least one list.

2. A method as claimed in claim 1 wherein one or more of said aliases are nested aliases that contain one or more aliases within them.

3. A method as claimed in claim 1 wherein said identified list or lists include lists for sending copies and/or sending blind copies and lists for groups.

4. A method as claimed in claim 1 wherein said transmission control directives are by means of exclusion string -E and inclusion string -I definitions in To:, Cc:, Bcc: and Group: identified lists of recipients, where Group: recipients include newsgroups.

5. A method as claimed in claim 1 wherein said transmission control directives are by means of exclusion string -E and inclusion string -I definitions, wherein said exclusion string defined twice for the same recipient or group of recipients effectively includes said recipient or group of recipients.

6. A method as claimed in claim 1, wherein the recipients are included and excluded from said identified list or lists based on the order in which the inclusion or exclusion is defined.

7. In a computing system, a method for transmitting e-mail (electronic mail) to a plurality of recipients identified by one or more aliases in identified list or lists of recipients, characterized in that said method includes selectively enabling or denying the transmission of email to identified recipients or groups of recipients in any of said aliases, comprising the steps of:

providing transmission control directives by the user;

parsing said transmission control directives to identity transmission requirements;

expanding aliases mentioned in any of said transmission control directives wherever necessary using stored lists of alias definition; and applying each said parsed transmission control directive on said aliases in said identified list or lists of recipients so as to exclude or include a recipient or a group of recipients in said identified list or lists, wherein said transmission control directives are by means of exclusion strings, Deny-To, Deny-Cc, Deny-Bcc, Deny-Group and Deny-Attachment, wherein Deny-To, Deny-Cc, Deny-Bcc and Deny-Group define recipients that are to be excluded from identified, To:, Cc:, Bcc: and Group: lists, respectively, and Deny-attachment identifies recipients that are excluded from receiving attachments.

8. A method as claimed in claim 7, wherein exclusion string -E and inclusion string -I are applied to exclusion string Deny-To:, Deny-Cc:, Deny-Bcc:, Deny-Group: and Deny-Attachment: to identify recipient for exclusion or inclusion.

9. In a computing system, a method for transmitting e-mail (electronic mail) to a plurality of recipients identified by one or more aliases in identified list or lists of recipients, characterized in that said method includes selectively enabling or denying the transmission of email to identified recipients or groups of recipients in any of said aliases, comprising the steps of:

providing transmission control directives by the user;

parsing said transmission control directives to identify transmission requirements;

expanding aliases mentioned in any of said transmission control directives wherever necessary using stored lists of alias definition; and applying each said parsed transmission control directive on said aliases in said identified list or lists of recipients so as to exclude or include a recipient or a group of recipients in said identified list or lists, wherein said transmission control directives are by means of exclusion string -E and inclusion string -I definitions in To:, Cc:, Bcc: and Group: identified lists of recipients, where Group: recipients include newsgroups.

10. An email transmission apparatus configured to transmit email messages to selected recipients and groups of recipients from identified list or lists of recipients; said apparatus having a central processing unit (CPU), associated memory and storage devices and input output devices, comprising:

an inputting mechanism for obtaining aliases and transmission control directives from the user;

a parsing mechanism for identifying transmission control directives provided by the user; an expansion mechanism for expanding aliases mentioned in any of said transmission control directives where necessary using stored alias definition lists; and a mechanism for excluding recipients from among the recipients in said identified at least one list and including recipients in addition to the recipients in said identified at least one list responsive to applying respective ones of the parsed transmission control directives on said aliases in said identified at least one list.

11. An email transmission apparatus as claimed in claim 10 wherein said inputting mechanism comprising:

an exclusion definition string, one or more aliases or email address strings to be excluded, and optionally, an inclusion definition string, and one or more aliases or email address strings to be included.

12. An email transmission apparatus as claimed in claim 10 wherein said parsing mechanism is any standard parsing means.

13. An email transmission apparatus as claimed in claim 10 said expansion mechanism comprising:

a database or file storage mechanism for storing the email addresses for each alias, and an accessing mechanism for retrieving the email addresses from said storage mechanism.

14. An email transmission apparatus as claimed in claim 10 wherein said transmission control directives include a Deny-To exclusion string defining recipients that are to be excluded from a To: identified list of recipients.

15. An email transmission apparatus as claimed in claim 10 wherein said transmission control directives include exclusion string -E and inclusion string -I definitions in To: identified lists of recipients.

16. An email transmission apparatus as claimed in claim 10, wherein the recipients are included and excluded from said identified list or lists based on the order in which the inclusion or exclusion is defined.

17. A computer program product comprising a computer usable storage medium having computer readable code embodied therein for causing a computer to transmit email to a plurality of recipients, characterized in that it includes:
- computer readable code devices configured to enable provision of aliases and transmission control directives by the user,
- computer readable code devices for parsing said transmission control directives to identify transmission requirements,
- computer readable code devices for expanding one or more aliases mentioned in any of said transmission control directives, where necessary using stored alias definition lists, and
- computer readable code devices for excluding recipients from among the recipients in said identified at least one list and including recipients in addition to the recipients in said identified at least one list responsive to applying respective ones of the parsed transmission control directives on said aliases in said identified at least one list.

18. A computer program product as claimed in claim 17 wherein said computer readable code devices for provision of transmission control directives by the user comprising:
- computer readable exclusion definition string,
- one or more alias or email address strings to be excluded, and optionally,
- computer readable inclusion definition string,
- one or more alias or email address strings to be included.

19. A computer program product as claimed in claim 17 wherein said computer readable code device for expansion of one or more aliases comprising:
- a first computer readable code device for storing the email addresses for each alias, and
- a second computer readable coded device for retrieving the email addresses from said storage.

20. A computer program product as claimed in claim 17, wherein the recipients are included and excluded from said identified list or lists based on the order in which the inclusion or exclusion is defined.

* * * * *